(12) United States Patent
Matsui et al.

(10) Patent No.: US 8,033,347 B2
(45) Date of Patent: Oct. 11, 2011

(54) FINAL DRIVE UNIT, CONSTRUCTION MACHINE EQUIPPED WITH THE SAME, AND METHOD OF WINDING CRAWLER BELT

(75) Inventors: Junichi Matsui, Kyotanabe (JP); Atsumi Araki, Yawata (JP); Yukio Kometani, Osaka (JP)

(73) Assignee: Komatsu Ltd., Tokyo (JP)

( * ) Notice: Subject to any disclaimer, the term of this patent is extended or adjusted under 35 U.S.C. 154(b) by 102 days.

(21) Appl. No.: 12/595,650

(22) PCT Filed: Apr. 24, 2008

(86) PCT No.: PCT/JP2008/057984
§ 371 (c)(1),
(2), (4) Date: Oct. 13, 2009

(87) PCT Pub. No.: WO2009/001613
PCT Pub. Date: Dec. 31, 2008

(65) Prior Publication Data
US 2010/0133020 A1 Jun. 3, 2010

(30) Foreign Application Priority Data
Jun. 28, 2007 (JP) ................. 2007-170776

(51) Int. Cl.
*B62D 55/12* (2006.01)
(52) U.S. Cl. ............... 180/9.64; 305/60; 29/428

(58) Field of Classification Search ............... 180/9.64; 29/428, 434; 305/60, 183, 193
See application file for complete search history.

(56) References Cited

U.S. PATENT DOCUMENTS

| 3,110,278 A | 11/1963 | Leader |
| 3,641,662 A | 2/1972 | Garman et al. |
| 3,722,330 A * | 3/1973 | Smekens ............... 81/15.8 |
| 4,258,463 A * | 3/1981 | Lindquist ............... 29/434 |
| 2008/0185911 A1* | 8/2008 | Rutz et al. ............... 305/136 |

FOREIGN PATENT DOCUMENTS

| JP | 48-40213 | 11/1973 |
| JP | 49-134028 | 12/1974 |
| JP | 04-328079 A | 11/1992 |
| JP | 2003-112672 A | 4/2003 |

* cited by examiner

*Primary Examiner* — Paul N Dickson
*Assistant Examiner* — Tashiana Adams
(74) *Attorney, Agent, or Firm* — Global IP Counselors (57) ABSTRACT

A final drive unit includes a sprocket, a hub unit and a holding portion. The hub unit is arranged inside the sprocket and includes a hub portion and a cover member mounted to the hub portion. At least the hub portion is configured and arranged to rotate about a rotational axis together with the sprocket. The holding portion is arranged on one of the hub portion and the cover member of the hub unit in proximity to an outer end of the one of the hub portion and the cover member with respect to an axial direction of the rotational axis. The holding portion is configured and arranged to hold an end of a wire-shaped member that pulls a crawler belt when the crawler belt is wound around the sprocket.

8 Claims, 11 Drawing Sheets

FINAL DRIVE UNIT, CONSTRUCTION MACHINE EQUIPPED WITH THE SAME, AND METHOD OF WINDING CRAWLER BELT

CROSS-REFERENCE TO RELATED APPLICATIONS

This national phase application claims priority to Japanese Patent Application No. 2007-170776, filed on Jun. 28, 2007. The entire disclosure of Japanese Patent Application No. 2007-170776 is hereby incorporated herein by reference.

TECHNICAL FIELD

The present invention relates to a final drive unit to be installed in a construction machine such as bulldozer and hydraulic excavator that runs on crawler belts, a construction machine including this final drive unit, and a crawler belt winding method.

BACKGROUND ART

Construction machines such as a bulldozer include a transmission, and a gear-type reduction gear such as a final drive unit. The transmission has a plurality of gears for transmitting power from an engine to a traveling unit that moves crawler belts or the like.

For example, Japanese Patent Laid-Open Publication TOKUKAI No. 2003-112672 (published on Apr. 15, 2003) discloses a final drive unit that includes a cross roller bearing, and an outer race and/or an inner race of the cross roller bearing that are integrally configured with components of the final drive unit. The cross roller bearing is disposed in one row to rotatably support a sprocket hub.

DISCLOSURE OF INVENTION

However, the aforementioned known final drive unit of the crawler-belt-type vehicle has the following problems.

Generally, in the construction machines and the like that run on crawler belts, two lengths of belts unjoined at the ends are provided that will form endless belts, and sprockets and the like of the construction machine are arranged on the two lengths of crawler belts unjoined at the ends. Then, one of the ends of each length of unjoined crawler belt is lifted by a crane, a forklift or the like so that each crawler belt is wound around the sprocket and the like.

However, particularly, in the case of a large-sized construction machine, since the weight of each component that composes a crawler belt is very large, even if the crawler belt is wounded by means of a crane, the workability is low.

That is, in the known final drive unit, when the crawler belt is wound around a sprocket or a rotating wheel as a final output end of the final drive unit, it is necessary to lift the crawler belt by means of an external, large-sized machine such as a forklift and a crane. For this reason, this work may be extensive, and may cause reduction in workability.

It is an object of the present invention to provide a final drive unit that can wind a crawler belt around a sprocket without using a large-scaled external machine or the like to improve the workability, a construction machine having this final drive unit, and a crawler belt winding method.

A final drive unit according to a first aspect of the present invention includes a sprocket, a hub unit, and a holding portion. The hub unit is arranged inside the sprocket and includes a hub portion and a cover member mounted to the hub portion. The hub unit is configured and arranged to rotate about a rotational axis together with the sprocket. The holding portion is arranged on one of the hub portion and the cover member of the hub unit in proximity to an outer end of the one of the hub portion and the cover member with respect to an axial direction of the rotational axis. The holding portion is configured and arranged to hold an end of a wire-shaped member that pulls a crawler belt when the crawler belt is wound around the sprocket.

In this configuration, since, when the crawler belt is wound around the sprocket as the final output end of the final drive unit, an end of a member such as wire line is held to the holding portion that is arranged in the part of the outer periphery part, the crawler belt can be guided to a desired location on the outer peripheral part of the sprocket.

In this case, for example, the aforementioned holding portion includes a portion that directly or indirectly holds the end of the wire-shaped member such as an eyebolt for holding the end of the wire-shaped member and a bolt hole that hold the eyebolt, and a welding portion that directly secures the end of a wire. Also, the aforementioned holding portion can be arranged in a part of a rotation member such as the hub that composes the outer peripheral part of the final drive unit. Also, for example, the aforementioned wire-shaped member includes not only a metal wire line but also other long objects such as a rope.

Since the rotation of the hub and the like thus rotates the holding portion together on which the end of the wire-shaped member is held, a rotating member such as the hub can wind the wire-shaped member. Accordingly, the crawler belt that is connected to another end of the wire-shaped member can be guided to the sprocket or a rotating wheel by rotation of the hub and the like. As a result, in winding work of a heavy crawler belt, the crawler belt can be effectively wound without using a large-sized external machine such as a crane. Therefore, the workability can be improved.

In this configuration, a part in proximity to an external end in the direction of the rotational axis is used for arrangement of the holding portion.

Accordingly, in the case where the wire-shaped member with its end being attached to the holding portion is wound around the periphery of the rotating member such as the hub, even if the wire-shaped member moves outward, the holding portion such as an anchor can hold parts of the wire-shaped member. As a result, it is possible to prevent that the wire-shaped member moves outward of the direction of the rotational axis and drops out of the rotating member.

A final drive unit according to a second aspect of the present invention is the final drive unit according to the first aspect of the present invention, wherein the holding portion includes an anchor that holds the end of the wire-shaped member.

In this configuration, an anchor such as an eyebolt is used as the holding portion holding an end of a wire-shaped member that pulls the crawler belt.

For example, a loop is formed at the end of the wire-shaped member to be hooked on an eyebolt or the like. Thus, the crawler belt can be guided to a predetermined location on the sprocket or a rotating wheel. Therefore, the crawler belt can be efficiently wound.

A final drive unit according to a third aspect of the present invention is the final drive unit according to the second aspect of the present invention, wherein the holding portion is detachably attached to the one of the hub portion and the cover member of the hub unit.

In this configuration, in the case where the anchor such as an eyebolt is used as the holding portion, members including this anchor and the like are detachably attached to an attachment part on the outer peripheral part of the final drive unit.

Accordingly, the holding portion can be detached from the outer peripheral part of the final drive unit except for crawler belt winding work. As a result, in usual construction machine work, it is possible to prevent that the holding portion interferes with the work, and that the holding portion may be damaged by shock or the like in the work.

A final drive unit according to a fourth aspect of the present invention is the final drive unit according to the first aspect of the present invention, wherein the holding portion includes a bolt hole configured and arranged to accommodate a bolt inserted therein with the bolt holding the end of the wire-shaped member.

In this configuration, a bolt hole that receives a bolt that holds the end of the wire-shaped member is used as the holding portion holding an end of a wire-shaped member that pulls the crawler belt.

In this configuration, this bolt hole may be one hole that is disposed on the outer peripheral surface of a rotating member such as the hub, or a plurality of holes may be uniformly spaced at an interval away from each other, for example.

In the crawler belt winding work, the bolt hole receives a certain bolt that holds the end of the wire-shaped member, and the hub and the like are rotated. Thus, it is possible to easily wind the crawler belt.

A final drive unit according to a fifth aspect of the present invention is the final drive unit according to the fourth aspect of the present invention, and further includes a cap member that covers the bolt hole.

In this configuration, a cap member covers the aforementioned bolt hole that receives a bolt that holds the end of the wire-shaped member.

Accordingly, even in the case where the bolt hole is disposed that receives a bolt that pulls the end of the crawler belt in the crawler belt winding work, it is possible to easily prevent problems such as setting of soil and the like in construction sites entering the bolt hole.

A final drive unit according to a sixth aspect of the present invention is the final drive unit according to any of the first to fifth aspects of the present invention, wherein the cover member is arranged on an external end of the hub portion in the axial direction of the rotational axis.

In this configuration, the hub that rotates about the rotational axis, or a main cover that is arranged on an external end in the direction of the rotational axis is used for arrangement of the holding portion.

Accordingly, the rotation of the hub can easily wind the wire-shaped member.

A final drive unit according to a seventh aspect of the present invention is the final drive unit according to any of the first to sixth aspects of the present invention, and further includes a groove-shaped recessed portion that is formed on an outer peripheral surface of the hub portion, or an outer peripheral surface of the cover member arranged on an external end of the hub portion in the axial direction of the rotational axis.

In this configuration, a groove-shaped recessed portion is provided on an end part of the outer peripheral surface of the hub or the like to prevent that the wire-shaped member moves outward when the wire-shaped member is wound.

In this case, this recessed portion may be formed in a ring shape along the outer peripheral surface of the rotating member such as the hub, or a plurality of recessed portions may be provided at predetermined locations on the peripheral surface.

Accordingly, in the case where the wire-shaped member with its end being attached to the holding portion is wound around the periphery of the rotating member such as the hub, even if the wire-shaped member moves outward, parts of the wire-shaped member can be held in the groove-shaped recessed portion. As a result, it is possible to prevent that the wire-shaped member moves outward and drops out of the rotating member.

A construction machine according to an eighth aspect of the invention includes the final drive unit according to any of the first to seventh aspects of the present invention, and a crawler belt, and a traveling unit that rotationally drives the crawler belt.

Thus, it is possible to provide a construction machine in that the workability of work for winding the crawler belt around the sprockets is improved to efficiently assemble the construction machine.

A crawler belt winding method according to a ninth aspect of the present invention is a method of winding a crawler belt on a sprocket of a final drive unit of a construction machine. The method includes the following steps. The crawler belt is placed on a floor in an unjoined state. A main unit of a construction machine that includes the final drive unit is placed so that the sprocket is arranged on the crawler belt. One end of the wire-shaped member is joined to one end of the crawler belt, and then another end of the wire-shaped member is held with the holding portion arranged on one of a hub portion and a cover member of a hub unit coupled to the sprocket, the holding portion being disposed in proximity to an outer end of the one of the hub portion and the cover member with respect to an axial direction of a rotational axis of the sprocket and the hub unit. The hub unit that includes the holding portion is rotated to move the one end of the crawler belt toward the sprocket as the wire-shaped member winds around the hub unit so that the crawler belt is mounted to the construction machine.

In this configuration, after a construction machine such as a bulldozer is placed so that the sprocket is arranged on the crawler belt placed on the floor, the crawler belt is wound around the sprocket by means of the aforementioned final drive unit.

Note that a length of belt unjoined at the ends refers to a crawler belt that has the ends before the length of belt is wound and the ends are joined to each other to form an endless belt.

Accordingly, in work for winding the crawler belt around the sprocket, it is unnecessary to use a large-sized external machine such as a crane and a forklift. As a result, it is possible to improve the workability of work for winding the crawler belt around the sprocket, which is included in assembly process of a construction machine, and thus it is possible to efficiently wind the crawler belt around the sprocket, particularly in the case of a large-sized construction machine.

BRIEF DESCRIPTION OF DRAWINGS

FIG. 4(*a*) is a partially enlarged view showing the configuration of an eyebolt and the like attached to a part of the final drive unit shown in FIG. 3.

FIG. 4(*b*) is a partially enlarged view showing the configuration of a part in proximity to a bolt hole that is formed in the case where the eyebolt can be detachably attached.

DETAILED DESCRIPTION OF THE PREFERRED EMBODIMENTS

With reference to FIGS. 1 to 11, the following description will describe a bulldozer (construction machine) 1 that includes a final drive unit 35 according to one embodiment of the present invention.

Configuration of Bulldozer 1

Figure 1:
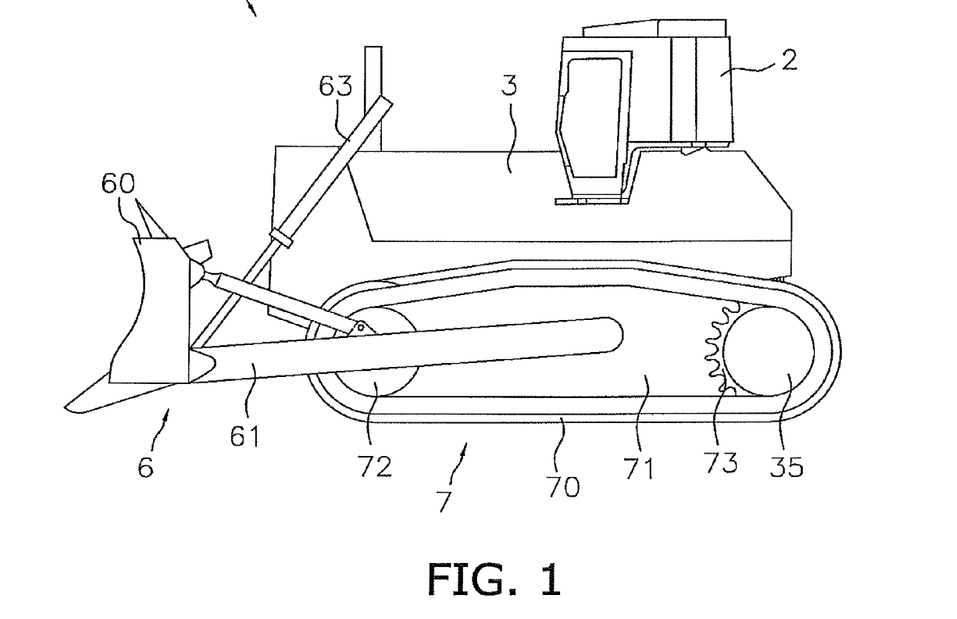
FIG. 1 is a side view of the outline of a bulldozer that includes final drive unit according to one embodiment of the present invention.

The bulldozer 1 according to this embodiment is a construction machine that levels rough ground, and mainly includes a cab 2, a main unit frame 3, a working mechanism 6 and a traveling unit 7 as shown in FIG. 1.

The cab 2 includes an operator seat, on which an operator sits, and levers, pedals, meters and the like for various types of operation. The cab 2 is composed of a floor frame (not shown) as its bottom, and pillars and side plates secured on the floor frame.

The working mechanism 6 and the traveling unit 7 are mounted to the main unit frame 3. The cab 2 is mounted on the upper part of the main unit frame 3. An engine 31 and the like are disposed in the main unit frame 3. Rotational driving force provided by the engine 31 is transmitted to sprockets 73 of the traveling unit 7 (discussed later) via the final drive unit 35. The internal configuration of the main unit frame 3 will be discussed later in detail.

As shown in FIG. 1, the working mechanism 6 is a mechanism that excavates ground and pushes soil forward, and includes a blade 60, support frames 61 and hydraulic cylinders 63. The blade 60 is arranged in front of the main unit frame 3, and has a plate shape with a curved front surface. One end of each support frame 61 is connected to the blade 60, and another end is connected to the traveling unit 7 to support the blade 60. The hydraulic cylinders 63 are extended/contracted to adjust the position of the blade 60 on an as-needed basis in ground leveling work.

The traveling unit 7 includes crawler belts 70, track frames 71 that extend along the front-and-rear direction of the machine, idlers 72, the sprockets 73 as running wheels and the like. The traveling unit 7 allows the machine to run on rough ground by means of a pair of endless crawler belts 70 that are arranged in right and left lower parts of the main unit frame 3.

Internal Configuration of Main Body Unit Frame 3

Figure 2:
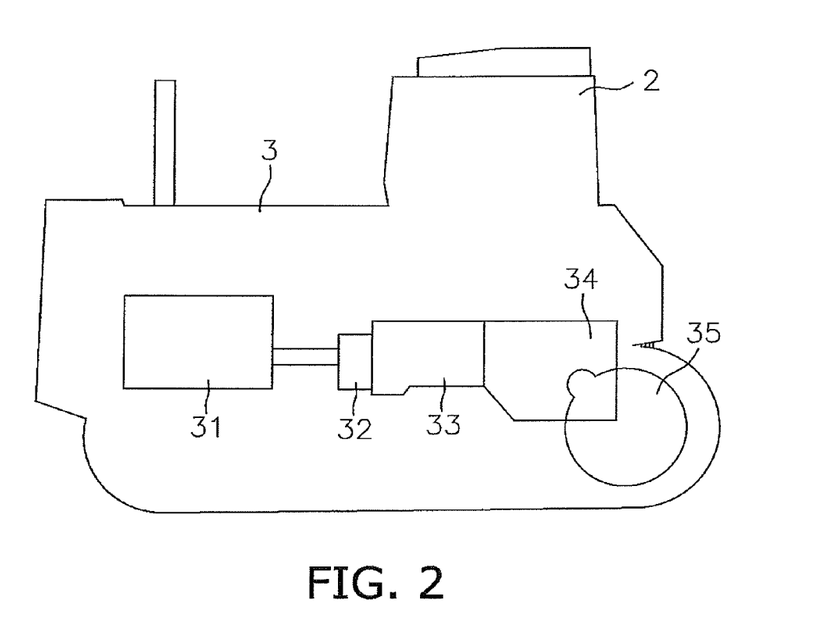
FIG. 2 is a cross-sectional view showing the internal configuration of a main unit frame of the bulldozer shown in FIG. 1.

As shown in FIG. 2, the main unit frame 3 accommodates the engine 31, a torque converter 32, a transmission 33, a steering gear box 34, the final drive unit 35 and the like.

The engine 31 is a power source for driving the working mechanism 6 and the traveling unit 7 that are installed in the bulldozer 1. The engine 31 is arranged in proximity to the central part inside the main unit frame 3.

The torque converter 32 transmits the power of the engine 31 to an input shaft of the final drive unit 35 via hydraulic oil, and is arranged in the rear side inside the main unit frame 3.

The transmission 33 appropriately adjusts the magnitude of rotational driving force of the engine 31 that is transmitted via the torque converter 32 depending on a working state, and then transits the adjusted force to the steering gear box 34, the final drive unit 35, and the sprockets 73. The transmission 33 is arranged behind and in proximity to the torque converter 32.

The final drive unit 35 is arranged on the right and left sides of the steering gear box 34, and transmits the driving force to the sprockets 73 around which the right and left crawler belts 70 are wound. In order to provide a high reduction ratio, the final drive unit 35 includes two or more reduction gears. The specific configuration of the final drive unit 35 will be discussed in detail later.

Configuration of Final Drive Unit 35

Figure 3:
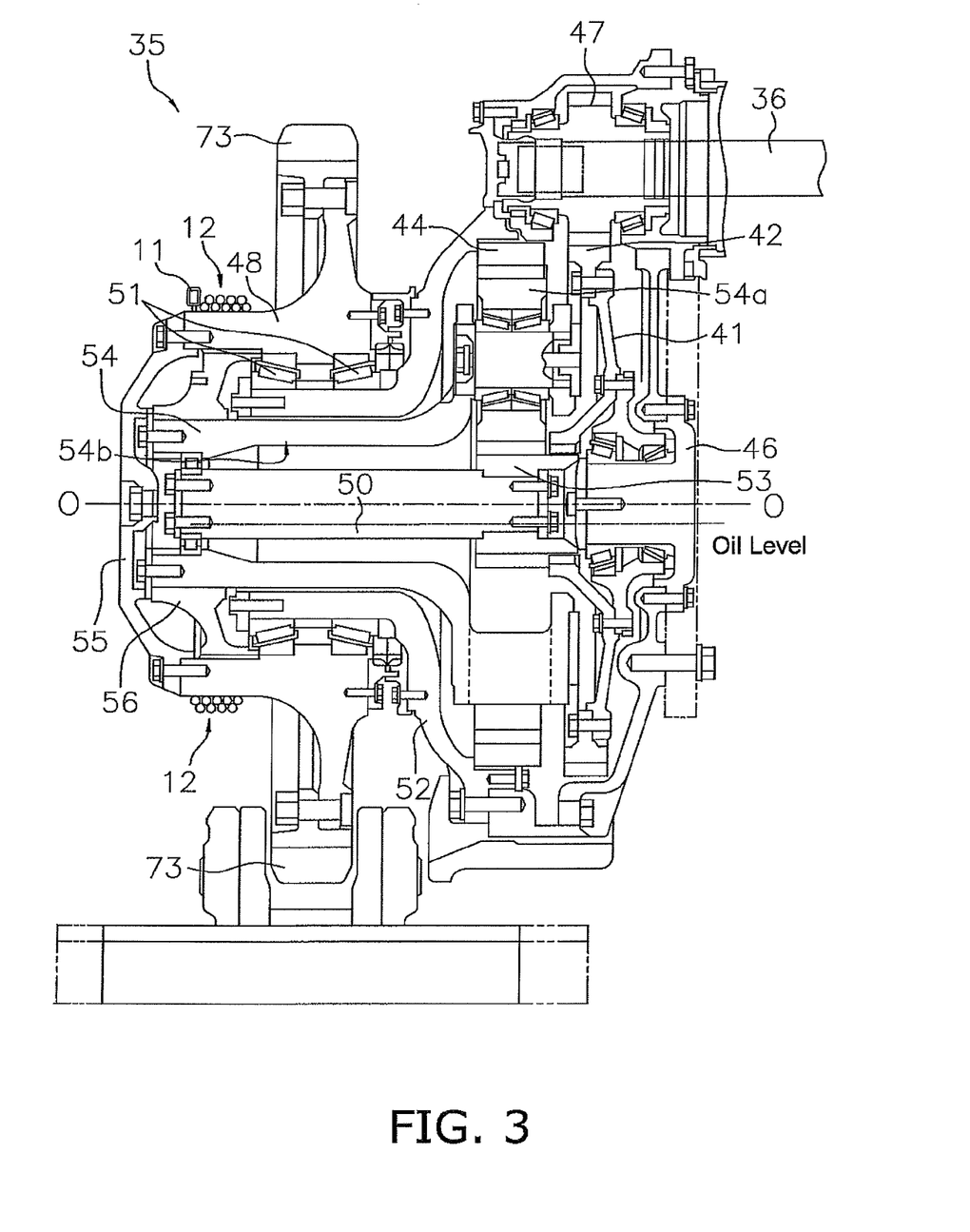
FIG. 3 is a cross-sectional view entirely showing the final drive unit installed in the main unit frame shown in FIG. 2 as viewed from the lateral side.
Figure 4:
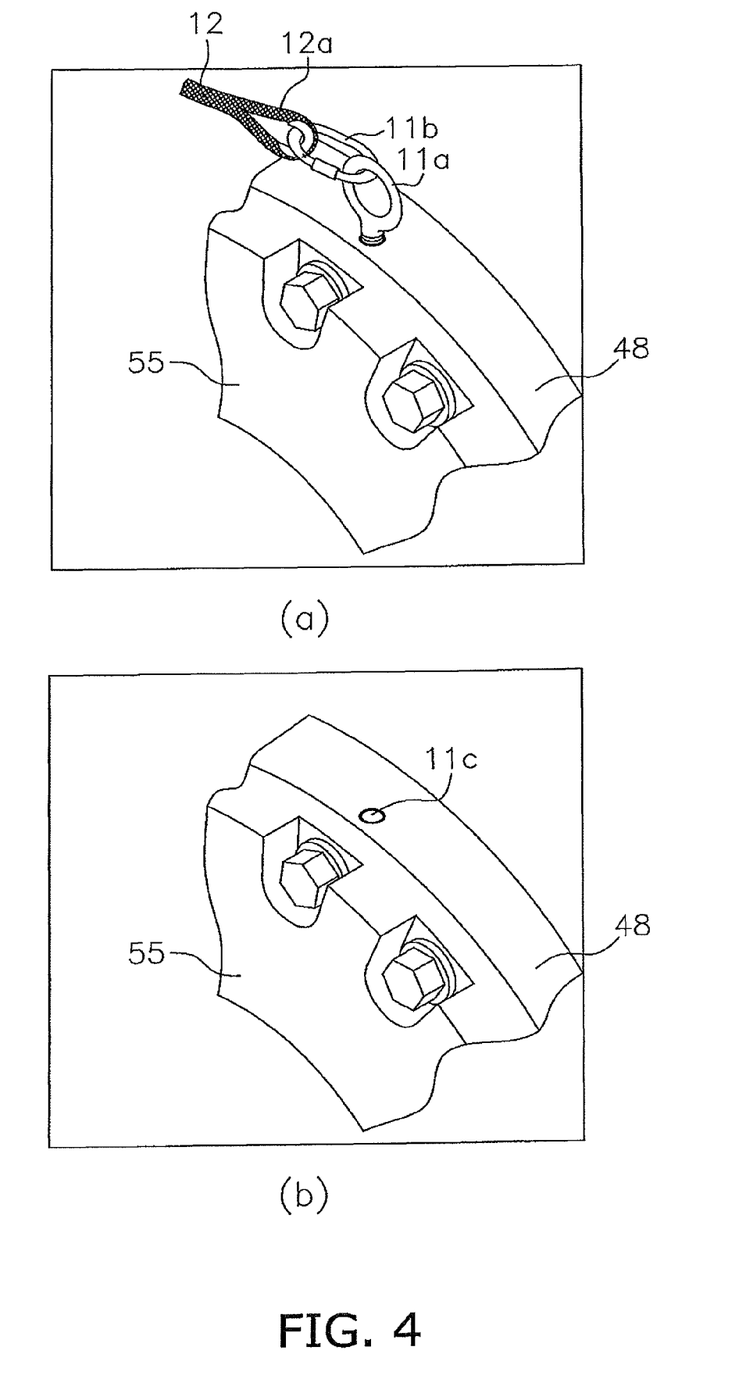

As shown in FIG. 3, in the final drive unit 35, an outer case 52 is mounted to the exterior side of an inner case 46 by bolts. The both cases 46 and 52 compose a case portion that forms the outer shell of the final drive unit 35, and stores lubricating oil 50.

The outer case 52 is arranged on a cylinder part shown on the left side in Figure, and is supported by conical roller bearings 51. In each of the conical roller bearings 51, rollers are circumferentially spaced at a predetermined interval away from each other. The conical roller bearings 51 support a sprocket hub (hub portion) 48 rotatably about a rotational axis O. Also, the sprocket 73 is mounted on the outer periphery of the sprocket hub 48. The crawler belt 70 (see FIG. 1) is wound around the sprocket 73. The crawler belt includes links and flat treads.

Also, the final drive unit 35 accommodates a first pinion 47 and a first gear 42 as a first reduction gear. A drive shaft 36 engages with a radially-inside part of the first pinion 47 by means of splines. The drive shaft 36 transmits the power from the steering gear box 34 (see FIG. 2). The first gear 42 is mounted on the hub 41 by bolts. A radially-inside part of the hub 41 engages with a lower tooth part of a sun gear 53 by means of splines.

Also, the final drive unit 35 accommodates a planet-gear train that is composed of the sun gear 53, planet pinions 54*a*, a carrier 54 and the ring gear 44 as a second reduction gear. The outer peripheral part of the ring gear 44 engages with radially-inside part of the outer case 52 by means of splines so that the rotation of the ring gear 44 is restricted. The carrier 54 has a cylindrical shaft portion 54*b*. The carrier 54 is coupled to the sprocket hub 48 via the hub 56 by splines. Thus, the rotation of the carrier 54 drives the sprocket 73.

In the aforementioned configuration, the power from the drive shaft 36 is transmitted to the first pinion 47, and is transmitted to the sun gear 53 via the first gear 42 that meshes with the first pinion 47 as rotational driving force. The rotation of the sun gear 53 is transmitted to the planetary pinions 54*a*. In this configuration, the ring gear 44 that meshes with the planetary pinions 54*a* is secured to the outer case 52. The planetary pinions 54a roll along the ring gear 44 and revolve around the sun gear 53 when the sun gear 53 rotates on its axis. The rotational driving force of the sun gear 44 serves as rotational driving force for the carrier 54 that supports the planetary pinions 54a, and is transmitted to the sprocket hub 48. The rotational direction of the carrier 54 is the same direction as the rotational direction of the sun gear 44. The rotational driving force transmitted to the sprocket hub 48 is transmitted to the sprocket 73, and rotates the crawler belt 70.

The sprocket hub 48 includes a cover member (main cover) 55 that is secured on the outer end side in the direction of the rotational axis in an inner periphery side of the sprocket hub 48 by bolt tightening. Also, the sprocket hub 48 has an eyebolt (holding portion or anchor) 11a. One end of a wire line (wire-shaped member) 12 is connected to the eyebolt 11a. The wire line 12 is used when the crawler belt 70 is wound around the outer peripheral surface that centers the rotational axis O.

Accordingly, after one end of the wire line 12 is connected to the eyebolt 11a and other end is connected to an end part 70a of the crawler belt 70 (see FIG. 6, etc.), the rotation of a rotating member side such as the sprocket hub 48 can simply wind the wire line 12 around the outer peripheral surface of the sprocket hub 48 as shown in FIG. 3.

The eyebolt 11a is arranged on a part of the outer peripheral surface that centers the rotational axis O of the sprocket hub 48 in proximity to the end in the direction of the rotational axis O. For this reason, in the final drive unit 35, in the process in that the wire line 12 is wound by rotating the rotating member side including the sprocket hub 48, even if the wire line 12 moves outward along the outer peripheral surface of the sprocket hub 48, the movement of the wire line 12 can be restricted. Therefore, it is possible to prevent that the wire line 12 drops out of on the outer peripheral surface of the sprocket hub 48. Also, the eyebolt 11a is connected to a connection ring 11b that is a ring-shaped member (see FIG. 4(a)). An eyelet 12a on the end of the wire line 12 is also held in the inner periphery side of the ring-shaped part in the connection ring 11b together with the ring part of the eyebolt 11a.

Figure 5:
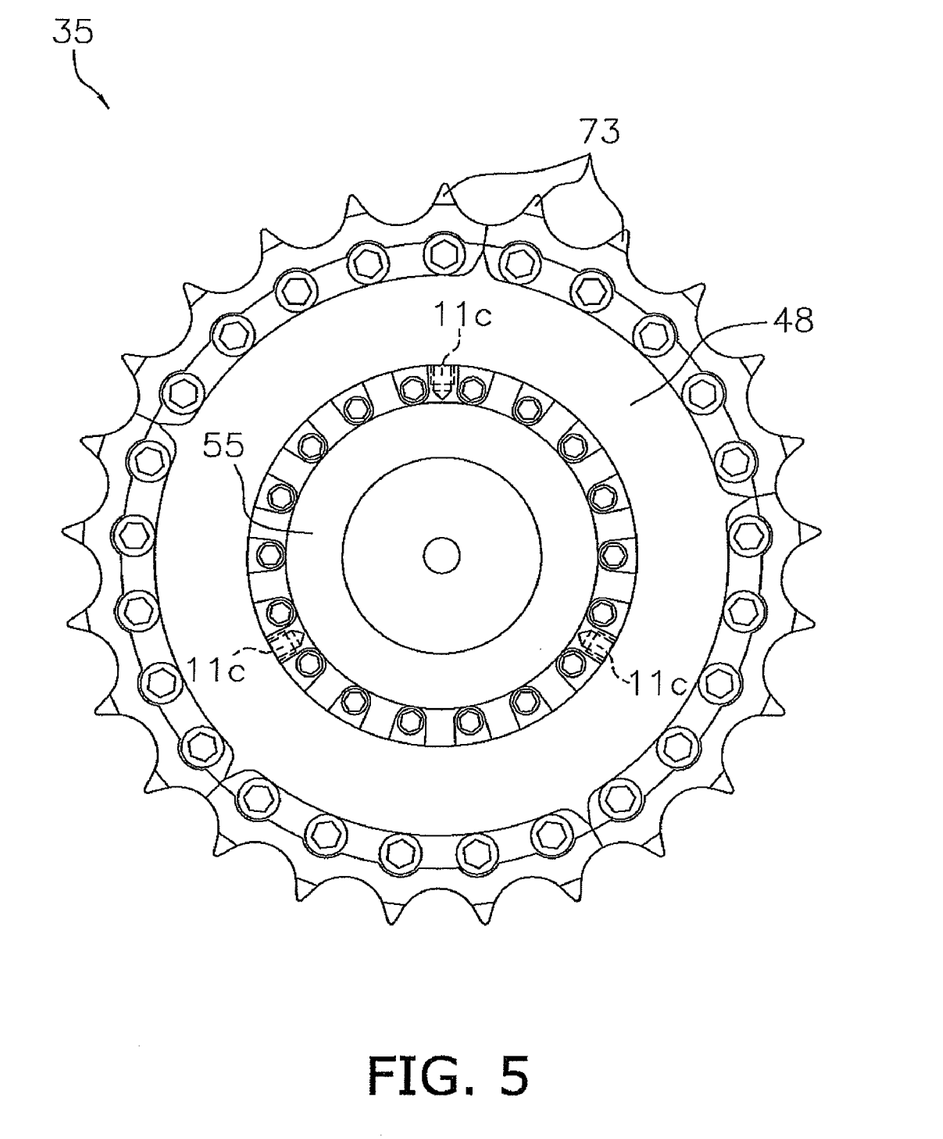
FIG. 5 is a front view showing the configuration of the final drive unit with three bolt holes shown in FIG. 4(*b*) being circumferentially spaced away from each other.

Also, when the eyebolt 11a is attached to the outer peripheral surface of the sprocket hub 48, as shown in FIGS. 4(a) and 4(b), a threaded part of the eyebolt 11a threadedly engages with a bolt hole (holding portion) 11c that is formed in the outer peripheral surface of the sprocket hub 48. This configuration provides detachable attachment of the eyebolt 11a. As shown in FIG. 5, three holes are formed as the bolt hole 11c for attachment of the eyebolt 11a at three locations that are circumferentially and uniformly spaced away from each other on the outer peripheral surface of the sprocket hub 48. Accordingly, in winding work of the crawler belt 70, workers can attach the eyebolt 11a to one of the bolt holes 11c closest to a location where the eyebolt 11a is most easily attached.

Winding Process of Crawler Belt 70

Figure 10:
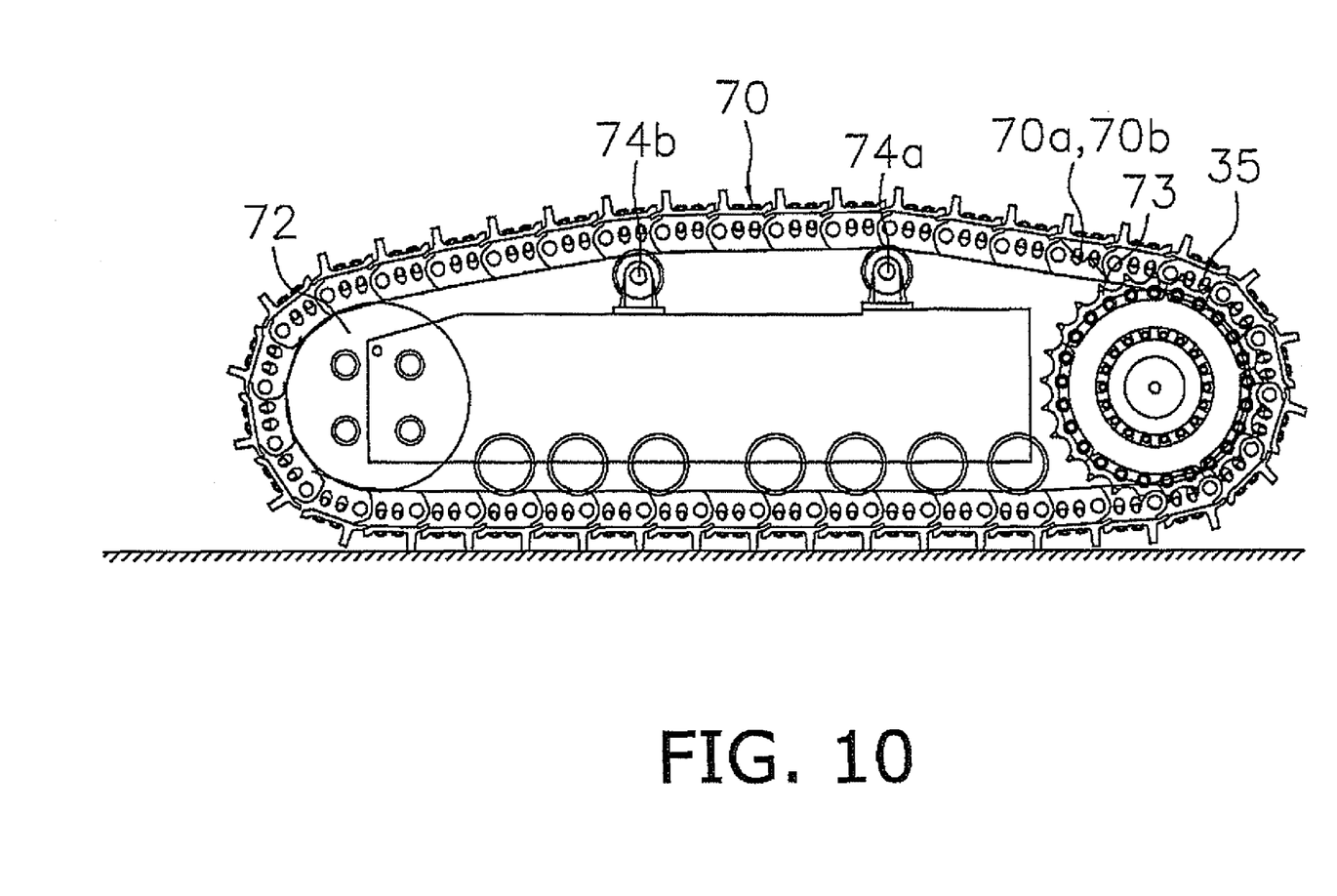
FIG. 10 is a front view showing a part of crawler belt winding process using the final drive unit shown in FIG. 3.
Figure 11:
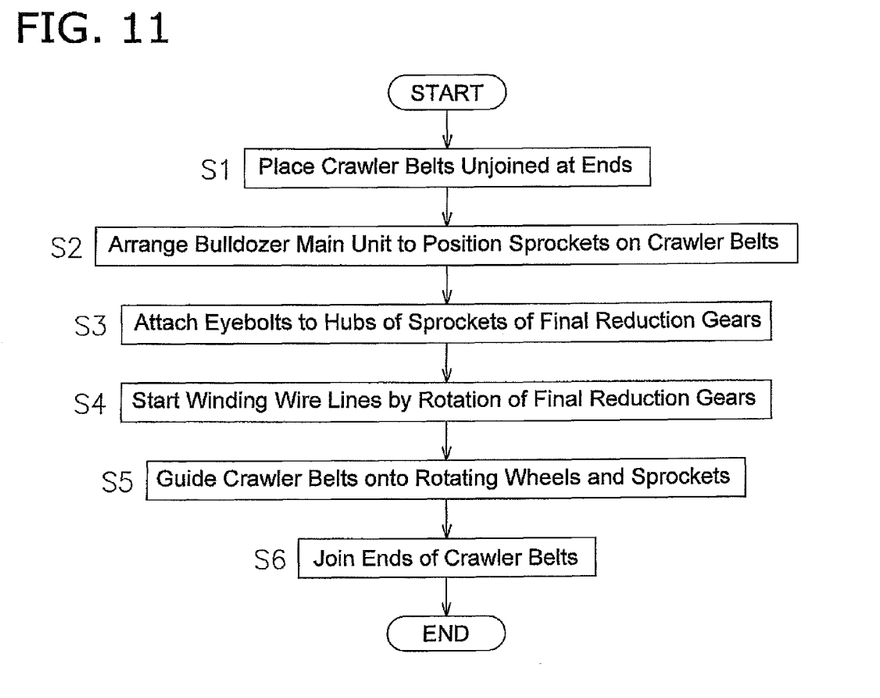
FIG. 11 is a flowchart showing the flow of the crawler belt winding process shown in FIGS. 6 to 10.

The following description will describe process of work for winding the crawler belt 70 around the sprocket 73 with reference to parts of the process shown in FIGS. 6 to 10, and a flowchart shown in FIG. 11.

In Step S1, the right and left crawler belts 70 are placed on a floor. Each of the crawler belts 70 is unjoined at the ends.

In Step S2, the sprockets 73 are positioned by using a crane or the like so that some teeth of the sprockets 73 are opposed to the crawler belts 70 placed on the floor, and then the main unit of the bulldozer 1 is arranged.

Figure 6:
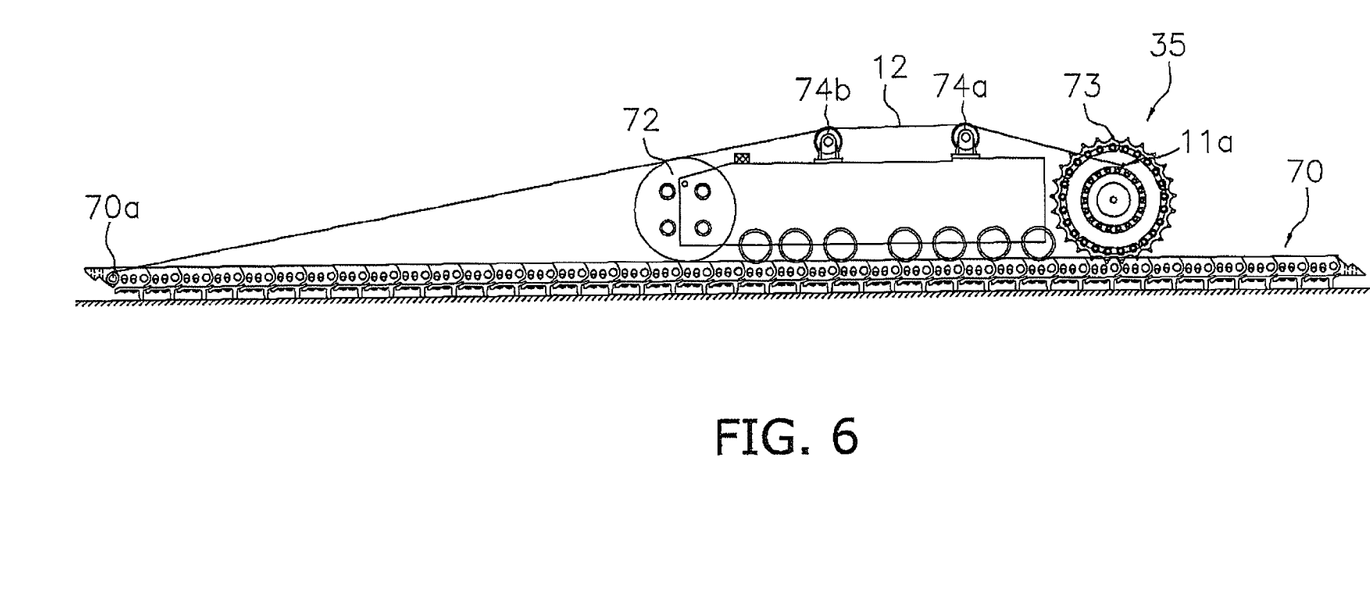
FIG. 6 is a front view showing a part of crawler belt winding process using the final drive unit shown in FIG. 3.

In Step S3, as shown in FIG. 6, the threaded part of the eyebolt 11a is threadedly attached to, among a plurality of the bolt holes 11c (see FIGS. 4(b) and 5) that are circumferentially formed to be substantially uniformly spaced away from each other on the outer peripheral surface of the sprocket hub 48 included in one of a pair of, right and left final drive units 35, one bolt hole 11c closest to a location where the eyebolt 11a is most easily attached (see FIG. 4(a)). In this step, one end of the wire line 12 can be first connected to the end part 70a of the crawler belt 70, and other end of the wire line 12 can be then connected to the eyebolt 11a side. Alternatively, the other end of the wire line 12 can be connected to the eyebolt 11a after the eyebolt 11a is held. Also, the end part of the crawler belt 70 and the wire line 12 can be connected to each other before or after the eyebolt 11a is held to the sprocket hub 48.

Figure 7:
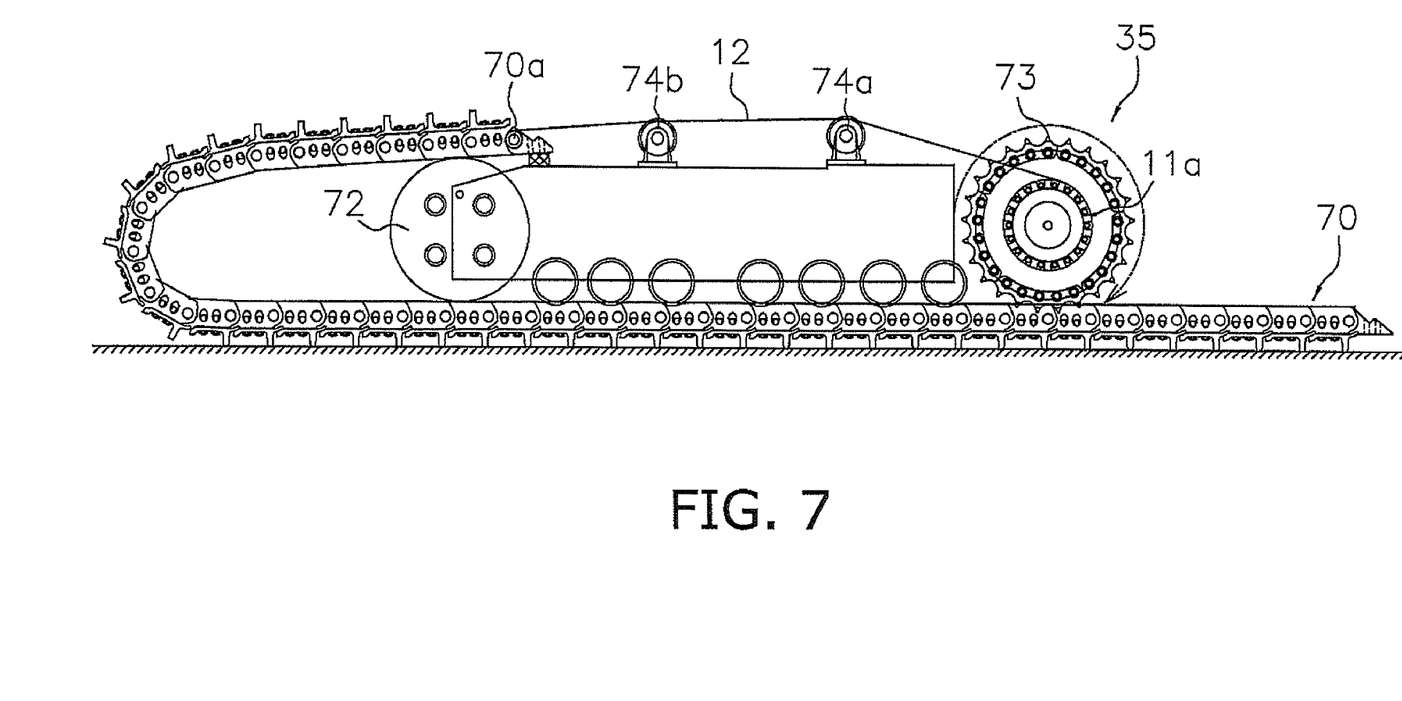
FIG. 7 is a front view showing a part of crawler belt winding process using the final drive unit shown in FIG. 3.

In Step S4, as shown in FIG. 7, the rotation sides including the sprocket hubs 48 of the final drive unit 35 are rotated so that the wire lines 12 are wound around the outer peripheral surfaces of the sprocket hubs 48. Thus, the end part 70a of the crawler belt 70 can be guided toward parts where the idler 72 and rotating wheels 74a and 74b are arranged. When the sprocket hubs 48 and the like are rotated to wind the wire lines 12, in order to guide the crawler belt 70 toward desired directions, it is preferable to stretch the wire lines 12 among the idler 72, rotating wheels 74a and 74b, and the like.

Figure 8:
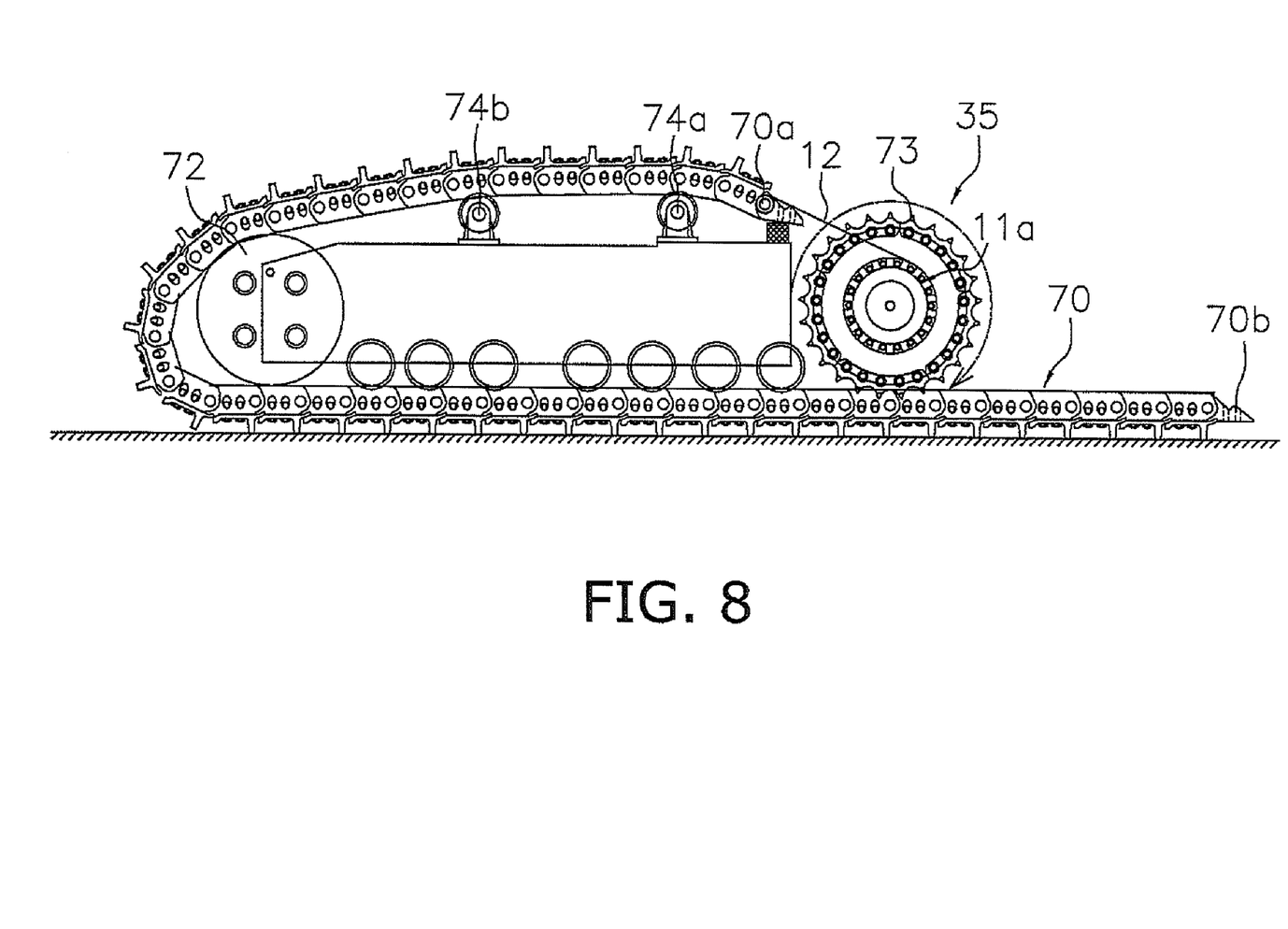
FIG. 8 is a front view showing a part of crawler belt winding process using the final drive unit shown in FIG. 3.
Figure 9:
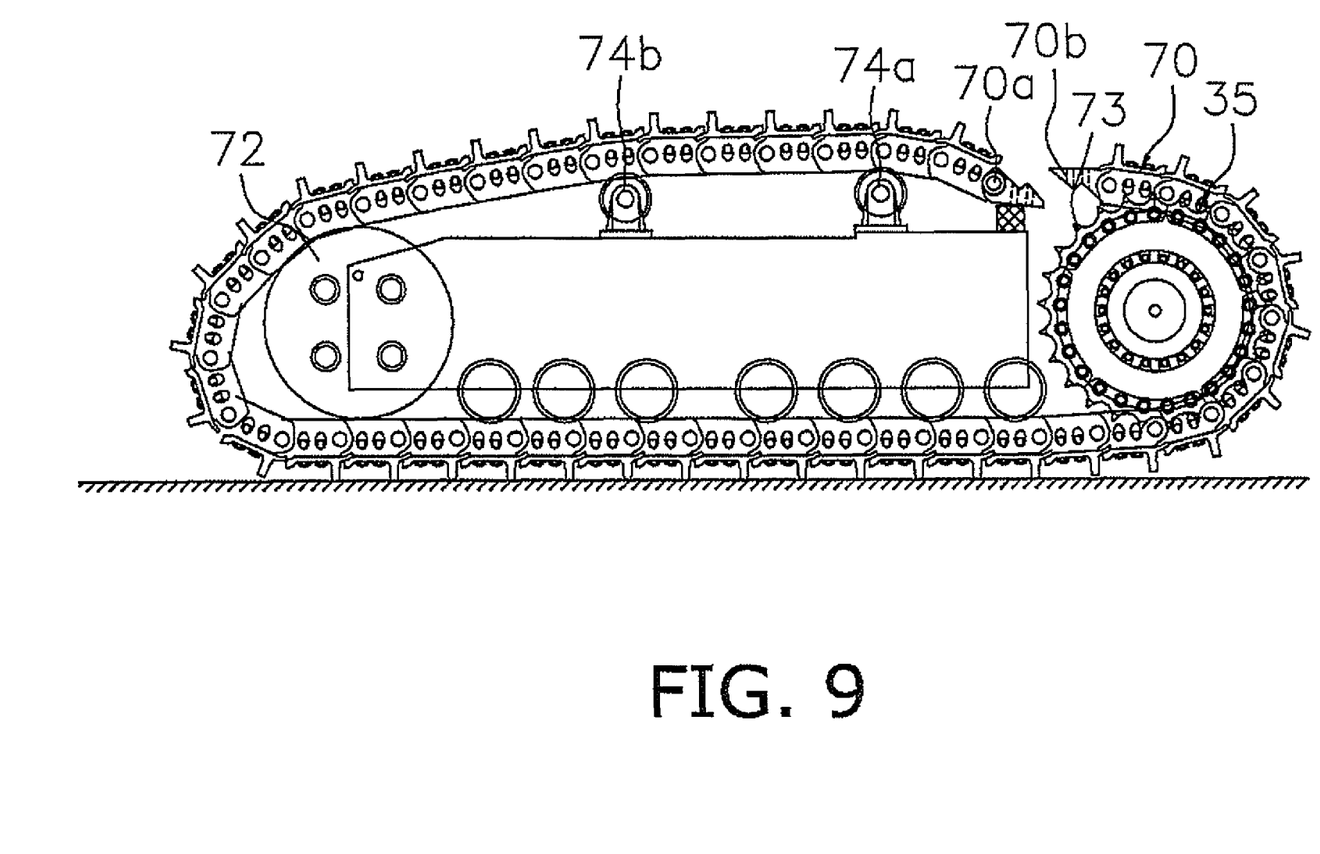
FIG. 9 is a front view showing a part of crawler belt winding process using the final drive unit shown in FIG. 3.

In Step S5, the wire line 12 is wound by the rotation of sprocket hub 48 and the like so that the crawler belt 70 is guided onto the idler 72 and the rotating wheels 74a and 74b, as shown in FIG. 8. Subsequently, a lift or the like lifts other end part 70b opposite to the end part 70a of the crawler belt 70 to which the wire line 12 is connected, and the end part 70b is moved toward the end part 70a (see FIG. 9).

In Step S6, as shown in FIG. 10, the end part 70a and the other end 70b of the crawler belt 70 are connected to each other by a pin (not shown).

After that, Steps S3 to S6 are similarly performed for other one of the pair of, right and left crawler belts 70 so that the crawler belt 70 is wound around the sprocket 73.

In this embodiment, the other end of the wire line 12 with the one end connected to the end part 70a of the crawler belt 70 is thus connected to the eye bolt 11 that is held to the sprocket hub 48. After that, rotation-side members including the sprocket hub 48 of the final drive unit 35 are rotated to wind the wire line 12 so that the end part 70a of the crawler belt 70 is guided to the sprocket 73 via the idler 72, the rotating wheels 74a and 74b.

Accordingly, the crawler belt 70 can be wound around the sprocket 73 and the like without using a large-sized external machine such as a crane. As a result, it is possible to improve the workability of work for winding the crawler belt 70, and to efficiently assemble the bulldozer 1.

Features of Final Drive Unit 35

(1) The final drive unit 35 according to this embodiment is a final drive unit that transmits rotational driving force to the sprocket 73 as a final output end around which the crawler belt 70 is wound, and includes the eyebolt 11a that is attached to the outer peripheral surface of the sprocket hub 48 that rotates the sprocket 73 from the inner periphery side of the sprocket 73 as shown in FIGS. 3, 6 and the like. The eyebolt 11a is connected to the other end (eyelet 12a) of the wire line 12 with the one end connected to the end part 70a of the crawler belt 70.

Accordingly, the rotation of the rotating-side members including the sprocket hub 48 can wind the wire line 12 connected to the end part 70a of the crawler belt 70. As a result, it is possible to guide the crawler belt 70 toward the sprocket 73 without using a large-sized external machine such as a crane. Therefore, it is possible to greatly improve the workability of work for winding the crawler belt 70 around the sprocket 73 and the like.

(2) In the final drive unit 35 according to this embodiment, as shown in FIG. 4(a), the eyebolt 11a that is one type of anchors is used as the holding portion that connects the end part 70a of the crawler belt 70 to the sprocket hub 48 via the wire line 12.

The eyelet 12a of the wire line 12 is hooked on the connection ring 11b of the eyebolt 11a. This hooking allows the wire line 12 to be easily wound around the outer peripheral surface of the sprocket hub 48. Therefore, the crawler belt 70 can be guided toward the sprocket 73 by this simple configuration.

(3) In the final drive unit 35 according to this embodiment, as shown in FIGS. 4(a) and 4(b), the eyebolt 11a that connects the end part 70a of the crawler belt 70 to the sprocket hub 48 via the wire line 12 is threadedly held to the outer peripheral surface of the sprocket hub 48, and is detachably attached.

Accordingly, the eyebolt 11a can be attached the sprocket hub 48 only in the work for winding the crawler belt 70, and can be detached after this work is completed. The eyebolt 11a can be attached only if necessary. For this reason, in usual work of the bulldozer 1 with the wound crawler belt 70, it is possible to prevent problems such as damage of the eyebolt 11a by soil or the like.

(4) In the final drive unit 35 according to this embodiment, as shown in FIG. 4(a), the eyebolt 11a as the holding portion is attached to, among the rotation-side members included in the final drive unit 35, the outer peripheral surface of the sprocket hub 48 that rotates the sprocket 73 from the inner periphery side.

The wire line 12 connected to the end part 70a of the crawler belt 70 is pulled by the eyebolt 11a that is attached to the outer peripheral surface of the sprocket hub 48 as the rotation-side member in the final drive unit 35. Thus, the crawler belt 70 can be guided to a desired location. Therefore, in the final drive unit 35, it is possible to easily wind the crawler belt 70.

(5) In the final drive unit 35 according to this embodiment, as shown in FIG. 4(a), as the holding portion to be connected to the eyelet 12a of the wire line 12 for winding the crawler belt 70, the eyebolt 11a is arranged in the outer end part of the sprocket hub 48 in the direction of the rotational axis O.

Accordingly, when the wire line 12 is wound around the outer peripheral surface of the sprocket hub 48, even if the wire line 12 moves outward as the sprocket hub 48 is rotated, the outward movement of the wire line 12 can be restricted by the eyebolt 11a. Therefore, it is possible to prevent that the wire line 12 drops out.

(6) As shown in FIG. 1, etc., the bulldozer 1 according to this embodiment includes the aforementioned final drive unit 35, the crawler belts 70 that is wound around the sprockets 73 as the final output ends of the final drive unit 35, and the traveling unit 7 that rotates and drives the crawler belts 70 in desired directions.

This configuration allows the crawler belts 70 to be easily wound around the sprockets 73 by means of the aforementioned final drive unit 35. Therefore, it is possible to wind the crawler belt 70 at high workability without using an external machine such as a large-sized crane.

(7) In the winding method of the crawler belt 70 according to this embodiment, as shown in FIG. 11, in Step S1, a length of crawler belt 70 unjoined at the ends is placed on the floor, and in Step S2, the bulldozer 1 is arranged so that the sprockets 73 are positioned on the crawler belts 70. In Step S3, the sprocket hub 48 holds the eyebolt 11a that is connected to the other end of the wire line 12 with the one end connected to the end part 70a of the crawler belt 70. In Step S4, the sprocket hub 48 is rotated to wind the wire line 12. In Step S5, the crawler belt 70 is guided toward the sprocket 73 and the like.

Accordingly, it is possible to easily wind the crawler belt 70 by using the final drive unit 35 without using a large-sized external machine such as a crane. Therefore, it is possible to greatly improve the workability of work for winding the crawler belt 70 as compared with conventional methods.

Other Embodiments

The above description has described an exemplary embodiment according to the present invention. However, the present invention is not limited to the foregoing embodiment. Various changes and modifications can be made without departing from the spirit of the present invention.

(A) In the foregoing embodiment, the eyebolt 11a as the holding portion has been illustratively described that is arranged in the outermost end part in the direction of the rotational axis of the sprocket hub 48. However, the present invention is not limited to this.

For example, the holding portion such as an eyebolt may be arranged not in a part in proximity to the outermost end in the direction of the rotational axis of the sprocket hub or the like but in a part in the innermost end.

However, in this configuration, in the process in that the wire line is wound around the outer peripheral surface of the sprocket hub several times, if the wire line moves axially outward, since the eyebolt is not arranged on the outside, outward dropping of the wire line cannot be prevented.

Figure 12:
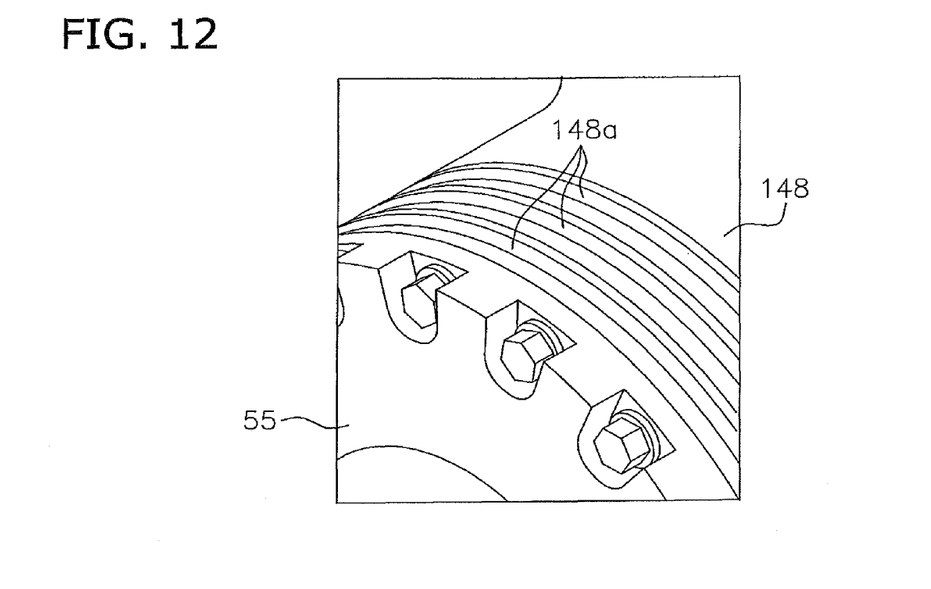
FIG. 12 is a partially enlarged view showing the configuration of the final drive unit according to another embodiment of the present invention.

For this reason, in this configuration, as shown in FIG. 12, it is preferable to form a plurality of grooves (recessed portions) 148a on the outer peripheral surface of a sprocket hub 148 where the wire line is wound several times.

Accordingly, the wire line to be wound around the outer peripheral surface of the sprocket hub 148 can be inserted into the grooves 149 and be stably wound along the grooves 148a. As a result, even in the case where the holding portion such as an eyebolt is not arranged in a part in proximity to the outermost end, it is possible to prevent that the wire line drops axially outward when wound.

(B) In the foregoing embodiment, it has been illustratively described that, in usual work or the like of the bulldozer 1, the detachable eyebolt 11a is detached from the sprocket hub 48 for the work. However, the present invention is not limited to this.

Figure 13:
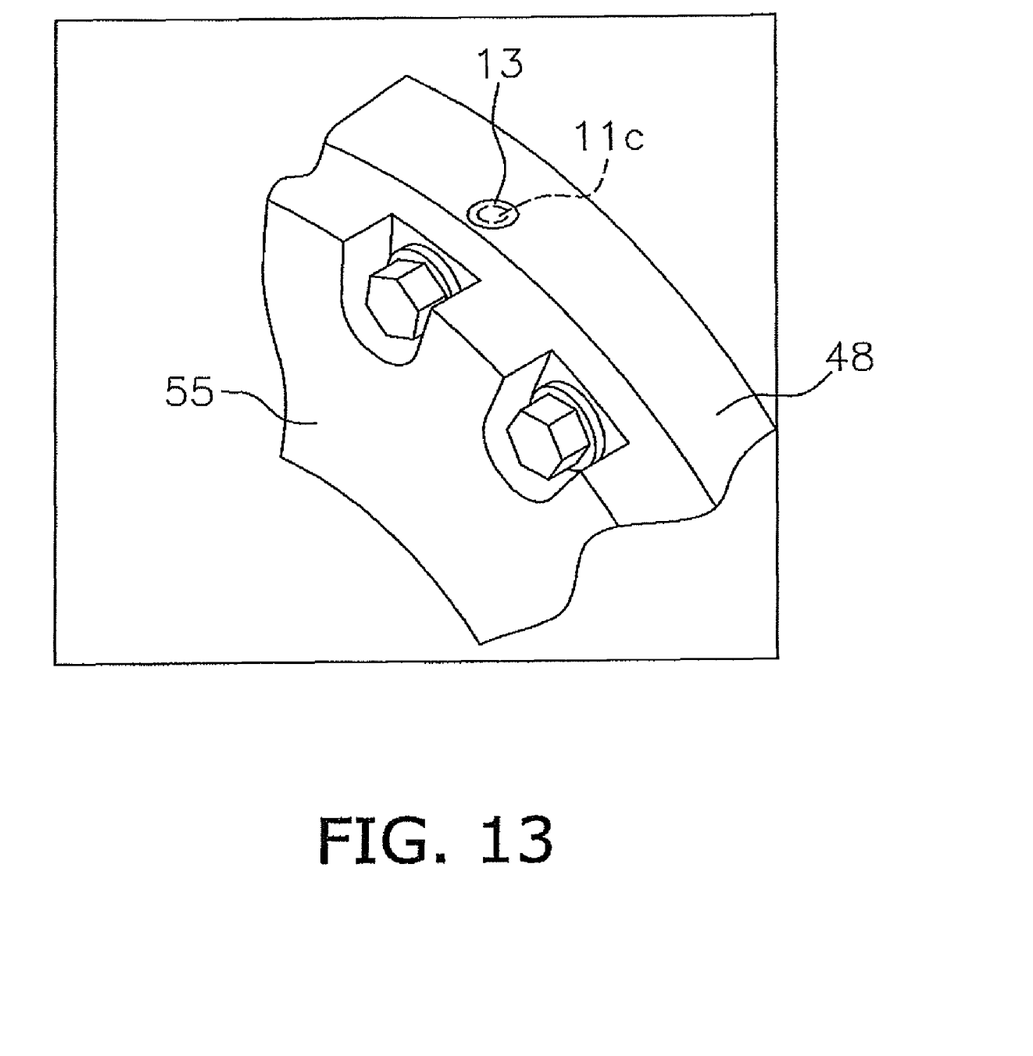
FIG. 13 is a partially enlarged view showing the configuration of the final drive unit according to still another embodiment of the present invention.

For example, as shown in FIG. 13, the bolt hole 11c may be provided with a cap (cap member) 13 that covers the hole that is exposed when the eyebolt or the like is detached.

This configuration can easily prevent that soil or the like in the construction sites enters the bolt hole 11c. Accordingly, even in the cases such as maintenance and breakdown where the crawler belt is detached and is then wound again, it is possible to prevent that soil or the like closes the bolt hole for holding the eyebolt.

(C) In the foregoing embodiment, the eyebolt 11a has been illustratively described to be used as the holding portion that holds the end of the wire line 12 for pulling the end of the crawler belt 70. However, the present invention is not limited to this.

For example, other than an eyebolt, a typical bolt may be attached as the holding portion to the bolt hole, or a part of metal wire line or the like may be directly welded as the holding portion to a predetermined location on the outer peripheral surface of the sprocket hub 48.

(D) In the foregoing embodiment, the bolt holes 11c to hold the eyebolt 11a as the holding portion has been illustratively described that are arranged at three locations that are circumferentially and substantially uniformly spaced at an interval from each other on the outer peripheral surface of the sprocket hub 48. However, the present invention is not limited to this.

For example, only one bolt hole, or four or more bolt holes may be arranged on the outer peripheral surface of the sprocket hub.

However, from the viewpoint of easy attachment of the holding portion such as an eyebolt irrespective of the rotational position of the sprocket hub, it is preferable that a plurality of bolt holes be circumferentially formed.

(E) In the foregoing embodiment, the eyebolt 11a as the holding portion has been illustratively described that is attached to a part of the outer peripheral surface of the sprocket hub 48. However, the present invention is not limited to this.

For example, the holding portion may be attached to the outer peripheral surface of a member such as the cover member 55 other than the sprocket hub 48.

(F) In the foregoing embodiment, the eyebolt 11a as the holding portion has been illustratively described that is detachably attached to the outer peripheral surface of the sprocket hub 48. However, the present invention is not limited to this.

For example, the holding portion may be non-detachably attached to the sprocket hub or the like.

However, as discussed above, from the viewpoint of preventing problems such as damage of the holding portion such as an eyebolt in usual work, it is preferable that the holding portion is attached only in the crawler belt winding work.

(G) In the foregoing embodiment, the metal wire line 12 has been illustratively described as the wire-shaped member with its ends being connected to the end part 70a of the crawler belt 70 and the eyebolt 11a (connection ring 11b) to pull the end of the crawler belt 70. However, the present invention is not limited to this.

For example, other than the metal wire, a fabric belt or other long objects such as a rope may be used.

(H) In the foregoing embodiment, it has been illustratively described that both the right and left crawler belts 70 are placed on the floor, and the sprockets 73 are positioned on both the crawler belts 70 so that the winding work is continuously performed. However, the present invention is not limited to this.

For example, the left and right crawler belts may be wound one after another. In other words, for example, after the right crawler belt is placed on the floor and is then wound, the left crawler belt may be placed on the floor and be then wound.

However, a large-sized crane or the like is required to arrange the bulldozer so that the sprocket is positioned on the crawler belt placed on the floor. For this reason, from the viewpoint of working efficiency, it is preferable that the positioning be performed after the pair of, right and left crawler belts are place on the floor.

(I) In the foregoing embodiment, the bulldozer 1 has been illustratively described as a construction machine that includes the final drive unit according to the present invention. However, the present invention is not limited to this.

For example, the final drive unit according to the present invention can be installed in other construction machines that run on crawler belts such as a hydraulic excavator, a crawler-belt-type loader, a crawler carrier and a self-running-type crusher.

Since a final drive unit according to the present invention has an effect in that a crawler belt can be wound without using a large-sized external machine such as a crane and a forklift, the present invention can be widely applied to a final drive unit used for traveling units not only in bulldozers but also in hydraulic excavators, crawler-belt-type loaders, crawler carriers, crawler-belt running type crushers and the like.

The invention claimed is:

1. A final drive unit comprising:
    a sprocket;
    a hub unit arranged inside the sprocket and including a hub portion and a cover member mounted to the hub portion, the hub unit being configured and arranged to rotate about a rotational axis together with the sprocket; and
    a holding portion arranged on one of the hub portion and the cover member of the hub unit in proximity to an external end of the one of the hub portion and the cover member with respect to an axial direction of the rotational axis, the holding portion being configured and arranged to hold an end of a wire-shaped member that pulls a crawler belt when the crawler belt is wound around the sprocket; wherein the cover member is arranged on an external end of the hub portion in the axial direction of the rotational axis.

2. The final drive unit according to claim 1, wherein the holding portion includes an anchor that holds the end of the wire-shaped member.

3. The final drive unit according to claim 2, wherein the holding portion is detachably attached to the one of the hub portion and the cover member of the hub unit.

4. The final drive unit according to claim 1, wherein the holding portion includes a bolt hole configured and arranged to accommodate a bolt inserted therein with the bolt holding the end of the wire-shaped member.

5. The final drive unit according to claim 4 further comprising
    a cap member that covers the bolt hole.

6. The final drive unit according to claims 1 further comprising
    a groove-shaped recessed portion that is formed on an outer peripheral surface of the hub portion, or an outer peripheral surface of the cover member arranged on an external end of the hub portion in the axial direction of the rotational axis.

7. A construction machine comprising:
    the final drive unit according to claim 1;
    the crawler belt wound around the sprocket; and
    a traveling unit configured and arranged to drive the crawler belt.

8. A method of winding a crawler belt on a sprocket of a final drive unit of a construction machine, the method comprising:
    placing the crawler belt on a floor in an unjoined state;
    placing a main unit of a construction machine including the final drive unit so that the sprocket is arranged on the crawler belt;
    joining one end of a wire-shaped member to one end of the crawler belt and then holding the other end of the wire-shaped member with a holding portion arranged on one of a hub portion and a cover member of a hub unit coupled to the sprocket, the holding portion being disposed in proximity to an outer end of the one of the hub portion and the cover member with respect to an axial direction of a rotational axis of the sprocket and the hub unit; and
    rotating the hub unit including the holding portion to move the one end of the crawler belt toward the sprocket as the wire-shaped member winds around the hub unit so that the crawler belt is mounted to the construction machine.

* * * * *